Aug. 14, 1928.
D. W. RIPLEY
1,680,570
SCALE HOPPER BOTTOM
Filed June 27, 1927
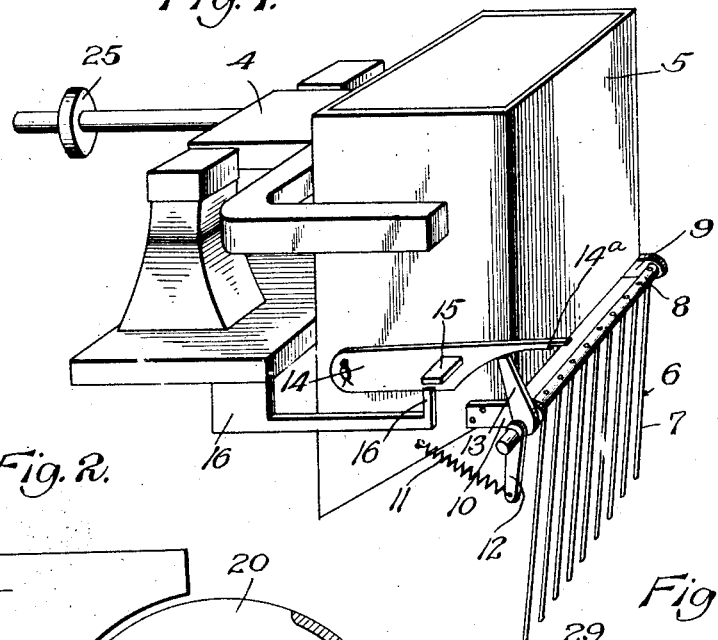
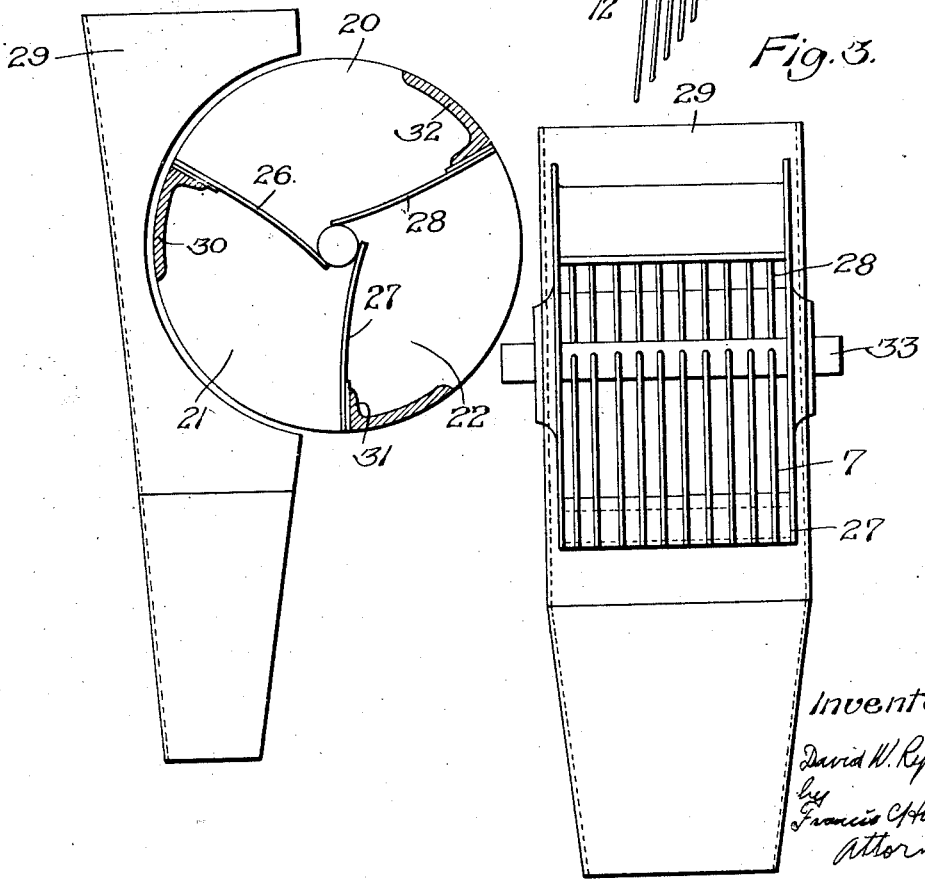
Inventor:
David W. Ripley
by Francis C. Hurlbut
Attorney Patented Aug. 14, 1928.

1,680,570

UNITED STATES PATENT OFFICE.

DAVID W. RIPLEY, OF FRESNO, CALIFORNIA, ASSIGNOR TO SUN-MAID RAISIN GROWERS OF CALIFORNIA, OF FRESNO, CALIFORNIA, A CORPORATION OF CALIFORNIA.

SCALE-HOPPER BOTTOM.

Application filed June 27, 1927. Serial No. 201,948.

My invention relates to the bottom of a hopper or chute, and more specifically to a device which will automatically relieve itself from sticky substances which are passing through the hopper or chute. This is valuable in weighing merchandise having a sticky exterior, such as raisins, and especially in connection with automatic weighing and packaging devices.

The object I have accomplished is the construction of a bottom for a slide or hopper which will automatically clean itself of substances which otherwise would adhere thereto. This and other objects hereinafter disclosed are accomplished by means of the device hereinafter described and illustrated by the accompanying drawing, in which Fig. 1 shows an ordinary weighing scale having a hopper with a bottom of the type I have invented. Fig. 2 shows a view of a hopper having a plurality of compartments, each compartment of which is fitted with one of my improved bottoms. Fig. 3 is a front view of the same device shown in Fig. 2.

In Fig. 1 above referred to, 4 is a balancing scale beam having a hopper 5 on one end and a moveable weight 25 at the other end. Hopper 5 is shown with four sides, and a bottom 6. Bottom 6 is composed of a plurality of wires or tines 7 which extend on a parallel plane from a common support 8, the support being pivoted at each end to two brackets 9 and 10 in such position so that the bottom 6 can be swung to close the bottom opening in the hopper 5, and swung to open it. The bottom is closed normally by a spring 11 which is anchored at one end to the frame of the hopper, and at the other end to an arm 12 which is attached to the support 8. To support 8 is attached a latch 13. When bottom 6 is closed, the latch 13 is engaged by a catch 14 which latch and catch hold the bottom 6 in a closed position. When a predetermined weight is placed in the hopper, the weight 25 moves up and hopper 5 is lowered and a dog 15 engages a stop 16, which in turn raises the catch 14, thus releasing the latch 13, and the weight on the bottom 6 of the hopper will automatically cause the bottom of the hopper to swing open. This action causes the merchandise which was on the bottom to drop and the spring 11 recloses the bottom and latch 13 and by means of a shoulder 14ᵃ on catch 14 hold it closed to receive another weight of merchandise. When the bottom 6 is closed it is not necessarily flush against the edges of the sides. These movements give the bottom 6 a jar so that the individual tines 7 will vibrate. These vibrations assist in clearing the tines of any sticky material left thereon by the merchandise passing through the hopper.

Figs. 2 and 3 show a rotating hopper having three compartments 20, 21 and 22. The bottoms 26, 27 and 28 of the compartments are formed of a plurality of tines 7. In each bottom these tines are attached at one end to a common base 30, 31 and 32, and in this respect are similar to the bottom of the hopper shown in Fig. 1. The hopper rotates on an axis 33. It receives its load when the opening is at the top and the load is discharged when in the rotation the opening is turned downwardly.

It will be noted that in my invention the area of the bottom to which merchandise can adhere, is much reduced over the usual form of bottoms made of sheet wood or metal. In cleaning my device the air, water or steam can be washed through more readily than it could on a plane surface.

Having described my invention, I claim as new and ask for Letters Patent:

1. A scale hopper bottom consisting of a plurality of tines arranged parallel on a common plane, spaced apart, and attached at one end to a member adapted to rotate, said tines being constructed of material which adapt the tines to vibrate.

2. A scale hopper bottom consisting of a plurality of tines arranged in a parallel relation on a common plane, spaced apart, said tines being attached at one end to a member pivotally mounted adapted to permit the bottom to swing to different positions, said tines being adapted to vibrate.

3. A scale hopper bottom consisting of a plurality of tines arranged in a parallel relation on a common plane, spaced apart, said tines being attached at one end to a member pivotally mounted and adapted to permit the bottom to swing to different positions, said tines being constructed of material which will vibrate.

4. A scale hopper bottom consisting of a support pivotally mounted adjacent to the hopper bottom, a plurality of tines attached radially to the support on a common plane, said tines being constructed of material which is tempered to adapt them to vibrate, and means for vibrating said tines.

5. In combination with a hopper, of a hopper bottom consisting of a plurality of metal tines constructed and tempered to adapt said tines to vibrate, said tines being attached at one end thereof to a common support pivotally connected to the hopper so that the tines can be swung to restrict the opening and means for vibrating the tines.

6. A hopper bottom consisting of a plurality of tines arranged in a parallel relation to each other on a common plane, a spaced distance apart, and attached at one end to a common member pivotally mounted and adapted to permit the bottom to swing to different positions, said tines being constructed of material tempered to vibrate like a tuning fork, means for imparting a vibratory movement to said tines.

7. A hopper bottom consisting of a plurality of tines arranged in a parallel relation on a common plane, spaced apart, and attached at one end to a member pivotally mounted and adapted to close or open said bottom by a swinging movement, said tines being constructed of material which adapt the tines to vibrate like a tuning fork when jarred, and means for jarring said tines.

DAVID W. RIPLEY.